United States Patent
Nimbalker et al.

(10) Patent No.: US 7,924,763 B2
(45) Date of Patent: Apr. 12, 2011

(54) METHOD AND APPRATUS FOR RATE MATCHING WITHIN A COMMUNICATION SYSTEM

(75) Inventors: Ajit Nimbalker, Arlington Heights, IL (US); Yufei W. Blankenship, Kildeer, IL (US); Brian K. Classon, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 790 days.

(21) Appl. No.: 11/953,922

(22) Filed: Dec. 11, 2007

(65) Prior Publication Data

US 2009/0147724 A1  Jun. 11, 2009

(51) Int. Cl.
*H04B 7/14* (2006.01)
*H04J 3/04* (2006.01)
*H04J 3/22* (2006.01)
*G06F 13/00* (2006.01)

(52) U.S. Cl. ......... 370/315; 370/535; 370/545; 711/157
(58) Field of Classification Search ............... 370/315
See application file for complete search history.

(56) References Cited

U.S. PATENT DOCUMENTS

| 5,878,085 A * | 3/1999 | McCallister et al. ......... 375/280 |
| 6,081,921 A * | 6/2000 | Simanapalli ............. 714/786 |
| 7,468,994 B2 * | 12/2008 | Tsuchiya ............... 370/539 |
| RE41,498 E * | 8/2010 | Park et al. ............. 714/755 |
| 2002/0015420 A1 * | 2/2002 | Yoon et al. .............. 370/468 |
| 2006/0093059 A1 * | 5/2006 | Skraparlis ............... 375/267 |
| 2010/0023844 A1 * | 1/2010 | Kang et al. .............. 714/786 |

OTHER PUBLICATIONS

Rowtich, et al., "On the Performance of Hybrid FEC/ARQ Systems Using Rate Compatible Punctured Turbo (RCPT) Codes," Communications, IEEE Transactions on vol. 48, Issue 6, Jun. 2000 pp. 948-959.
Ishii, "Draft Report of 3GPP TSG RAN WG1 #48," R1-070xxx, MCC Support, v0.2.0, "3GPP RAN1#48," St. Julians, Malta, Mar. 26-30 2007., 3 pages.
Ericsson, Motorola, et al.,"QPP Interleaver parameters," R1-071195, 3GPP RAN1#48, St. Louis (USA), Feb. 12-16, 2007, pp. 1-4.
3GPP "Multiplexing and Channel Coding (FDD) (Release 6)," TS 25.212 v6.4.0 (Mar. 2005), 14 pages.
Motorola, et al., "EUTRA FEC Enhancement," R1-061050, 3GPP TSG RAN WG1#44bis, Athens, Greece. Mar. 27-31, 2006, 14 pages.
Land, et al., "Partially Systematic Rate ½ Turbo Codes", Proc. 2nd Intl Symp. on Turbo Codes, Brest, France, pp. 287-290, Sep. 4-7, 2000.
Crozier, et al., "On Designing Turbo-Codes with Data Puncturing," Proceedings of the 2005 Canadian Workshop on Information Theory (CWIT 2005), Montréal, Quebec, Canada, Jun. 5-8, 2005, 4 pages.

* cited by examiner

*Primary Examiner* — Jeffery Pwu
*Assistant Examiner* — Guang Li

(57) ABSTRACT

A method and apparatus for rate matching is described. During operation of a transmitter, multiple data streams are received and individually interleaved with a permutation of a same length $K_\Pi$. A permutation ($\pi_{p0}$) of a second stream is the same as a permutation ($\pi_{sys}$) of a first stream and a permutation ($\pi_{p1}$) of a third stream is different from the permutation of the first stream. Each element of $\pi_{p1}$ is derived from the corresponding element of $\pi_{sys}$. The plurality of interleaved streams are multiplexed to form a circular buffer. Finally, data is transmitted from the circular buffer.

18 Claims, 6 Drawing Sheets

300

600

METHOD AND APPRATUS FOR RATE MATCHING WITHIN A COMMUNICATION SYSTEM

FIELD OF THE INVENTION

The present invention relates generally to communication systems and in particular, to a method and apparatus for rate matching within a communication system.

BACKGROUND OF THE INVENTION

In a communication system, error control techniques are used to protect a signal against impairment during transmission over a channel. As part of such error control techniques, a codeword is produced for every information block. In order to match an over-the-air transmission rate, the codeword is resized via a rate matching algorithm before being sent over the physical channel. The rate matching algorithm provides a desired number of bits to be sent over the channel where puncturing or repetition of the codeword may be applied. The rate matching algorithm is important in that it can significantly impact the system performance and implementation efficiency.

If the system uses forward error correction (FEC) only, then only one transmission is needed for a given information block, and the rate matching algorithm only provides one version of the codeword. If the system uses Hybrid Automatic Repeat reQuest (HARQ) operation, then multiple transmissions may be needed for a given information block, and the rate matching algorithm may be required to provide different versions of the codeword, for example, for incremental redundancy (IR) HARQ. HARQ degenerates to FEC if only one transmission is used for an information block.

One way to perform the rate matching function is to define puncturing/repetition patterns for every information block size and code rate the system may encounter. However, this method is inflexible. Moreover, it becomes impractical if the system involves a large number of information block size and code rate combinations, such as in a 3rd Generation Partnership Project (3GPP) communication system.

Another way to perform rate matching is to define a rule that steps through the codeword bits one by one and determines if a codeword bit should be punctured (removed) or repeated. Such a method has the benefit of flexibility and is defined in 3GPP Rel-99. However such a method suffers from implementation inefficiency. Further, there is no way to guarantee that the transmissions associated with a given information block do not overlap (i.e., orthogonal) for IR HARQ. Thus the system performance may suffer.

Alternatively, a circular buffer based rate matching algorithm may be designed to provide good performance with low implementation complexity. In this method, the codeword bits are rearranged to form a circular buffer. If $N_{desired}$ coded bits are needed for transmission, a length-$N_{desired}$ block of consecutive useful bits (skipping dummy or filler bits, for example) are taken from the circular buffer (wrapped around to the beginning if last bit of the circular buffer is reached). Therefore, puncturing and repetition can be achieved using a single method. The circular-buffer technique has advantages in flexibility, performance, and ease of implementation. A key in designing a circular buffer based rate matching algorithm is to generate puncturing patterns to puncture the output of the turbo coder, while ensuring good performance at the desired code rate (or rates) of operation. Therefore, a need exists for a method and apparatus for circular buffer based rate matching within a communication system that ensures good performance at desired code rates.

BRIEF DESCRIPTION OF THE DRAWINGS

FIG. 7 is a flow chart showing operation of the receiver of FIG. 6

DETAILED DESCRIPTION OF THE DRAWINGS

Figure 1:
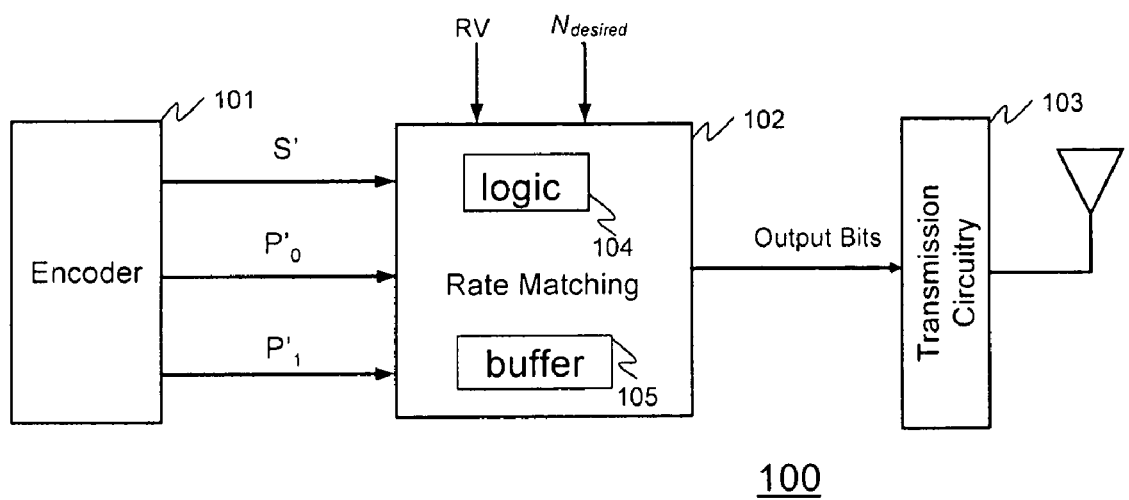
FIG. 1 is a block diagram of a transmitter.

In order to address the above-mentioned need, a method and apparatus for circular buffer based rate matching is provided herein. During operation of a transmitter, multiple data streams are received and each data stream is individually interleaved with a permutation of a same length $K_\Pi$. A permutation ($\pi_{p0}$) of a second stream is the same as a permutation ($\pi_{sys}$) of a first stream and a permutation ($\pi_{p1}$) of a third stream is different from the permutation of the first stream. Each element of $\pi_{p1}$ is derived from the corresponding element of $\pi_{sys}$. The plurality of interleaved streams are multiplexed to form a circular buffer. Finally, data is transmitted from the circular buffer.

The present invention enhances the performance of circular buffer rate-matching by a joint optimization of the sub-block interleavers that are components in circular buffer design. The design has a performance advantage because it allows further flexibility in puncturing pattern design by allowing puncturing of some systematic bits in a first transmission without degrading performance. Thus, the invention enhances the performance of the circular buffer rate-matching in a wide-range of coding rates and these enhancements are more prominent at higher coding rates (as high as rate-0.9 or higher). From an implementation perspective, the invention proposes a simple way of generating the subblock interleavers.

The present invention encompasses a method for operating a transmitter. The method comprises the steps of receiving a first, second, and third data stream and individually interleaving each data stream with a permutation of a same length $K_\Pi$ to produce first, second, and third interleaved streams. A permutation ($\pi_{p0}$) used to produce the second interleaved stream is the same as a permutation ($\pi_{sys}$) used to produce the first interleaved stream and a permutation ($\pi_{p1}$) used to produce the third interleaved stream is different from $\pi_{sys}$, and each element of $\pi_{p1}$ is derived from the corresponding element of $\pi_{sys}$. The interleaved streams are multiplexed to form a circular buffer and then the bits are transmitted from the circular buffer.

The present invention additionally encompasses a method for operating a receiver. The method comprises the steps of receiving a signal comprising contents of a circular buffer over a channel, de-multiplexing the signal to form a plurality of interleaved streams, and individually de-interleaving each stream according to a permutation to form a plurality of de-interleaved data streams. A permutation ($\pi_{p0}$) used to de-interleave a second stream is the same as a permutation ($\pi_{sys}$) used to de-interleave a first stream and a permutation ($\pi_{p1}$) used to de-interleave a third stream is different from $\pi_{sys}$, and each element of $\pi_{p1}$ is derived from the corresponding element of $\pi_{sys}$. The plurality of de-interleaved data streams are then passed to a decoder.

The present invention additionally encompasses an apparatus comprising an encoder outputting a plurality of data streams, interleaving circuitry individually interleaving each data stream, bit-collection circuitry multiplexing the interleaved streams to form a circular buffer, and transmission circuitry transmitting bits from the circular buffer. During interleaving, a first, second, and third interleaved stream is formed by using a permutation of a same length $K_\Pi$, wherein a permutation ($\pi_{p0}$) used to form the second interleaved stream is the same as a permutation ($\pi_{sys}$) used to form the first interleaved stream and a permutation ($\pi_{p1}$) used to form the third interleaved stream is different from $\pi_{sys}$ and each element of $\pi_{p1}$ is derived from the corresponding element of $\pi_{sys}$.

The present invention additionally encompasses an apparatus for operating a receiver. The apparatus comprises receiving circuitry receiving contents of a circular buffer over a channel, a de-multiplexer de-multiplexing the signals to form a plurality of interleaved streams, and a de-interleaver individually de-interleaving each interleaved stream according a permutation to form a first, second, and third de-interleaved data stream. A permutation ($\pi_{p0}$) used to form the second de-interleaved data stream is the same as a permutation ($\pi_{sys}$) used to form the first de-interleaved data and a permutation ($\pi_{p1}$) used to form the third de-interleaved data stream is different from $\pi_{sys}$, and each element of $\pi_{p1}$ is derived from the corresponding element of $\pi_{sys}$.

In the description below, the terms "interleave" and "permute", "interleaver" and "permutation" are used interchangeably. Also, the term "sub-block interleaver" is sometimes referred to as "interleaver" or "permutation". Additionally, all modulo operations are indicated by either "%" or "mod".

Figure 2:
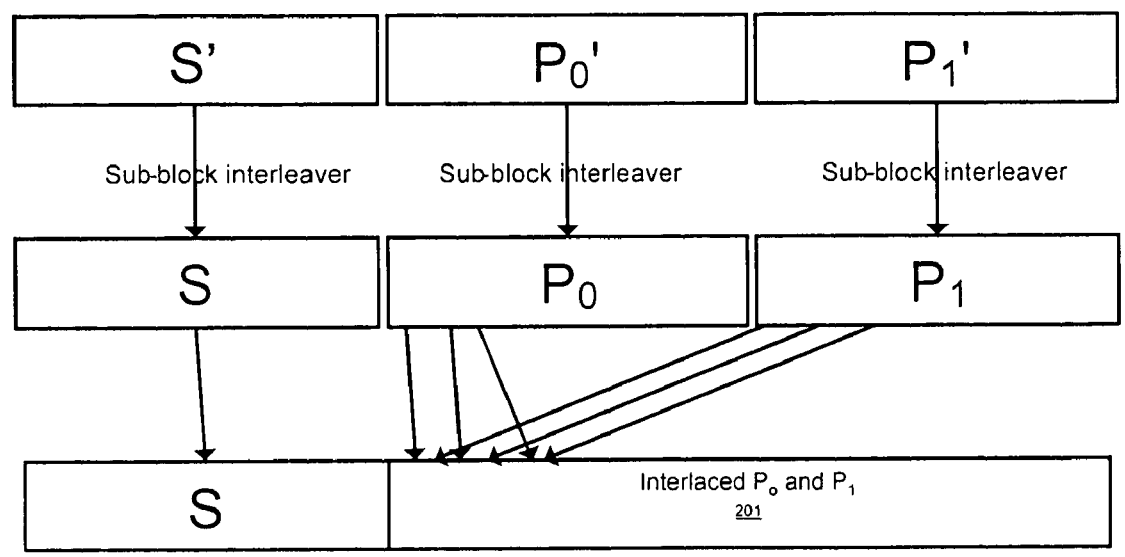
FIG. 2 illustrates sub-block interleaving and interlacing.

Turning now to the drawings, wherein like numerals designate like components, FIG. 1 and FIG. 2 illustrate the functionality of a circular buffer based rate matching method. More particularly, FIG. 1 is a block diagram of a transmitter and FIG. 2 illustrates sub-block interleaving and interlacing. During operation of transmitter 100, encoder 101 outputs a systematic bit stream and at least two parity streams. For this particular example, encoder 101 comprises a rate-⅓ turbo coder adopted in the 3GPP standardization. It is noted that the following concepts can be adapted to other types of error correction codes, such as turbo codes with other code rates, non-systematic turbo codes, low-density parity check (LDPC) codes, Reed Solomon codes, convolutional codes, etc. The data streams comprise symbol streams or bit streams. While the discussion assumes the streams contain binary bits, in general the streams may contain symbols and the procedures may be operated on symbols instead. For example, a symbol is composed of two bits for duo-binary turbo codes.

Encoder 101 outputs three streams corresponding to the systematic bit stream and the two parity streams. In certain cases the systematic stream may contain several (e.g., 4) bits that are not systematic, e.g., due to tail bits as for the 3GPP turbo code. (Tail bits are absent when tail-biting encoding is used.) The streams may also contain filler bits inserted prior to turbo encoding. For simplicity, all the bits in the systematic stream are referred to as systematic bits, and all the bits in the respective parity streams are referred to as parity 0 bits and parity 1 bits, respectively. These three streams are also referred to as a first stream, second stream and a third stream in the discussion. Thus, for the example described in FIG. 1, the first stream comprises a systematic stream, the second stream comprises a first parity stream, and the third stream comprises a second parity stream.

The streams output from encoder 101 are passed to the rate matching circuitry 102. This is illustrated in FIG. 2 where S', $P_0'$ and $P_1'$ are systematic bit stream, parity 0 bit stream (i.e., the first parity bit stream) and parity 1 bit stream (i.e., the second parity bit stream), respectively. Logic circuitry 104 receives the bit streams output from encoder 101 and performs interleaving on each stream individually. The interleaving step comprises the step of interleaving via a sub-block interleaver. Each stream is rearranged (or interleaved, or permuted) with its own sub-block interleaver to produce streams S, $P_0$ and $P_1$. To ensure good turbo code performance under puncturing, a subblock interleaver that selects bits evenly distributed over the trellis is desired. In particular, a permutation is needed such that the first l ($1 \leq l \leq L$) bits of the subblock interleaved sequence are always approximately evenly distributed in the non-interleaved bit stream regardless of l. Here L is the length of the bit stream. For example, for the 3GPP turbo code, L=K+4, where K is the length of the bit sequence input to the turbo encoder and 4 tail bits are appended to each bit stream at the output of turbo encoder due to trellis termination. This ensures that the code bits selected by the rate matcher are approximately evenly distributed in both constituent code trellises, regardless of the target code rate. Several subblock interleaving schemes can be used to achieve this purpose.

Streams S, $P_0$ and $P_1$ are then multiplexed to produce a circular buffer which contains the multiplexed streams. One way of multiplexing $P_0$ and $P_1$ is to interlace the streams on a bit-by-bit basis. It is also possible to interlace the streams on the granularity of groups of bits. In general interleaved streams $P_0$ and $P_1$ are interlaced with each other to produce an intermediate stream which is the interlaced $P_0$ and $P_1$ portion 201. In a preferred embodiment, interlacing of $P_0$ and $P_1$ produces sequence $[P_0(0), P_1(0), P_0(1), P_1(1), \ldots, P_0(L-1), P_1(L-1)]$, where $P_0(i)$ is the i-th bit of stream $P_0$, $P_1(i)$ is the i-th bit of stream $P_1$. A single output buffer 105 (also called circular buffer) is formed by storing the rearranged systematic bits S in the beginning followed by interlaced $P_0$ and $P_1$ portion 201. Thus, the multiplexing of the plurality of interleaved streams to form the circular buffer comprises the steps of interlacing the interleaved second stream and interleaved third stream to form an intermediate stream; and concatenating the interleaved first stream with the intermediate stream. Note that for ease of explanation, a buffer 105 is illustrated in FIG. 1. However, for implementation, the buffer may be virtual in that the functionality of such a buffer is realized without actually storing the multiplexed bits in a physical buffer.

For a desired code rate of operation, the number of coded bits $N_{desired}$ to be selected for transmission is passed to logic circuitry 104 as an input. Logic circuitry 104 simply reads out a length-$N_{desired}$ block of consecutive useful bits from the circular buffer (wrapped around to the beginning if last bit of the circular buffer is exceeded) from a certain starting point. Therefore, puncturing and repetition can be achieved using a single method. Useful data bits are any bits in the circular buffer that are deemed worthwhile to transmit over the channel. For example, data bits other than (a) dummy bits or (b) filler bits in S and $P_0$ may be considered as useful bits. It is noted that while dummy or filler bits may be necessary from an implementation perspective, it might be wasteful to actually transmit these bits over the channel. The circular-buffering technique has an advantage in flexibility (in code rates achieved) and granularity (in streams sizes). Circular buffer rate matching selects parity bits approximately evenly distributed over the code trellis irrespective of desired code rate of operation if the sub-block interleavers are designed properly.

Figure 3:
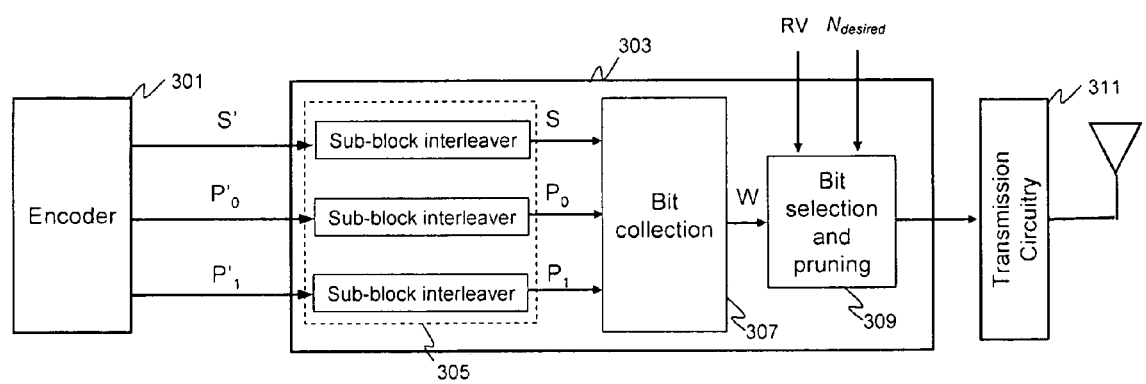
FIG. 3 is a block diagram of a transmitter.

FIG. 3 is a block diagram of transmitter 300 employing the rate matching technique described above. Transmitter 300 comprises encoder 301, rate matching circuitry 303, and the transmission circuitry 311. Rate matching circuitry 303 additionally comprises sub-block interleavers 305, bit-collection unit 307, and a bit-selection and pruning unit 309. Elements 305, 307, and 309 are preferably logic circuitry embodied in a microprocessor, microcontroller, digital signal processors (DSPs), or such other devices known to those having ordinary skill in the art. For example, the particular operations/functions of interleavers 305, collection unit 307, and bit selection and pruning unit 309, and thus of transmitter 300 are determined by an execution of software instructions and routines. Memory may be utilized to assist the operations of elements 305, 307, and 309, where the memory comprises a random access memory (RAM), dynamic random access memory (DRAM), and/or read only memory (ROM) or equivalents thereof. Encoder 301 is preferably a rate-⅓ 3GPP turbo coder, however, the techniques described herein for operating transmitter 300 may be applied to other encoders, including, but not limited to turbo coders performing turbo coding with other code rates, with tail bits or no tail bits, tail-biting, binary or duo-binary turbo coders, with or without filler bits insertion, convolutional codes, . . . , etc.

Sub-block interleavers 305 may use any permutation that reorders the bits in a length-L input bit stream to form a length-L output stream, not counting any dummy bits which may exist in the output stream. Denote the permutation for S', $P'_0$ and $P'_1$ streams by $\pi_{sys}$, $\pi_{p0}$, and $\pi_{p1}$, respectively. Normally, the sub-block interleavers denote the bit index in the sub-block before interleaving, i.e., $S(i)=S'(\pi_{sys}(i)), 0 \leq i < L,$ $P_0(i)=P'_0(\pi_{p0}(i)), 0 \leq i < L,$ $P_1(i)=P'_1(\pi_{p1}(i)) 0 \leq i < L.$ In a preferred embodiment, a block interleaver based (also called "rectangle" or "row-column") permutation may be used for permuting each of the three input streams. The block interleaver may utilize permuting columns (or rows) based on a permutation as explained below. Let L be the length of the input stream to a sub-block interleaver, the dimensions of the block interleaver being C columns and R rows. In other words, the block interleaver is ⌈L/C⌉ rows by C columns, with length $K_\Pi$=⌈L/C⌉×C. First the input bits are written row-wise into the rectangle starting from the top left corner. Then, column permutations according to a length-C permutation are performed. Finally, the output stream is read out column-by-column starting from the top left corner. The block interleaver thus obtained can be equivalently described by $$\pi(i) = \left(P\left(\left\lfloor \frac{i}{R} \right\rfloor\right) + C \times (i \bmod R)\right) \bmod K_\Pi,$$

where 'mod' indicates modulo operation, and sequence {P(0), . . . , P(C−1)} is the inter-column permutation pattern.

When the rectangle is not full, dummy bits (denoted by <NULL>) are attached to fill up the ⌈L/C⌉×C−L positions in the rectangle, and these dummy bits are discarded at the end of rate matching. The dummy bits may reside in any predefined locations in the rectangle. For example, the dummy bits may be attached to the front or the end of the input stream before writing into the rectangle. For the purpose of sub-block interleaving, the dummy bits in each stream need not be differentiated from the non-dummy bits in the stream. Thus, the sub-block interleaver may be defined for length $K_\Pi$, regardless of presence of dummy bits. Thus, the step of individually interleaving each data stream may comprise the step of adding dummy bits to each stream before individually interleaving so that each stream has length $K_\Pi$. In the following, the discussion assumes that the sub-block interleaver length is $K_\Pi$.

Normally the rate matching algorithm employs the same permutation for S', $P'_0$ and $P'_1$ streams. Therefore, if $\pi_{sys}$ denotes the permutation for the systematic stream, then the permutation for the two parity streams are obtained as follows.

$\pi_{p0}(i)=\pi_{sys}(i), 0 \leq i < K_\Pi$ $\pi_{p1}(i)=\pi_{sys}(i), 0 \leq i < K_\Pi$ However, for certain turbo codes, such rate matching algorithm exhibits undesirable performance at high coding rates such as code rate 0.9.

To ensure good performance at high coding rates, the permutation for $P'_0$ and $P'_1$ streams may be different from the permutation of S'. For simpler implementation, $\pi_{p0}(i)$ and $\pi_{p1}(i)$ may be related to $\pi_{sys}(i)$ via a function for each $0 \leq i < K_\Pi$. The functions may be different for $\pi_{p0}$ and $\pi_{p1}$. It is possible that all three permutations $\pi_{sys}$, $\pi_{p0}$, and $\pi_{p1}$ are different; or two of the permutations are the same, but the third permutation is different.

In a preferred embodiment, each element of the permutation $\pi_{p1}$ of the third stream is derived from a corresponding element of the permutation $\pi_{sys}$ of the first stream via function $\pi_{p1}(i)=f(\pi_{sys}(i),\delta_1)$, $0 \leq i < K_\Pi$, where $\delta_1$ is an integer. The permutation of the second stream $\pi_{p0}$ can be chosen as the same as that of the first stream $\pi_{sys}$.

In another embodiment, $\pi_{p0}$ and $\pi_{p1}$ may be derived from $\pi_{sys}$ via a function with non-null constant offset. In one example, the offset $\delta_1$ may be applied to the third stream ($P'_1$) in the following fashion, $\pi_{p1}(i)=(\pi_{sys}(i)+\delta_1) \bmod K_\Pi, 0 \leq i < K_\Pi$ where mod denotes the modulo operation. The offset value may be set as a constant. This constant may be determined based on the block size or other factors.

In another preferred embodiment, $\delta_1=1$. If $\delta_1=1$, $\pi_{p1}(i)=(\pi_{sys}(i)+1) \bmod K_\Pi, 0 \leq i < K_\Pi.$ In particular, if $\pi_{sys}$ is a block interleaver with column permutation {P(0), . . . , P(C−1)}, then $$\pi_{p1}(i) = \left(P\left(\left\lfloor \frac{i}{R} \right\rfloor\right) + C \times (i \bmod R) + 1\right) \bmod K_\Pi.$$

Assuming block interleaving is used as sub-block interleavers, the overall sub-block interleaver operation can be described with the following steps. In the following description, $d^{(0)}$ represents the systematic bit stream S', $d^{(1)}$ represents the first parity bit stream $P_0'$, and $d^{(2)}$ represents the second parity bit stream $P_1'$; $v^{(0)}$ represents the interleaved systematic bit stream S, $v^{(1)}$ represents the interleaved first parity bit stream $P_0$, and $v^{(2)}$ represents the interleaved second parity bit stream $P_1$.

(1) Assign C to be the number of columns of the matrix. The columns of the matrix are numbered 0, 1, 2, ..., C−1 from left to right.
(2) Determine the number of rows of the matrix, R, by finding minimum integer R such that:

$$L \leq (R \times C).$$

The rows of rectangular matrix are numbered 0, 1, 2, ..., R−1 from top to bottom.

(3) If R×C>L, then $N_D=(R \times C-D)$ dummy bits are padded such that $y_k=$<NULL> for $k=0, 1, \ldots, N_D-1$. Then, write the input bit sequence, i.e., $y_{N_D+k}=d_k^{(i)}$, $k=0, 1, \ldots, L-1$, into the R×C matrix row by row starting with bit $y_0$ in column 0 of row 0:

$$\begin{bmatrix} y_0 & y_1 & y_2 & \cdots & y_{C-1} \\ y_C & y_{C+1} & y_{C+2} & \cdots & y_{2C-1} \\ \vdots & \vdots & \vdots & \ddots & \vdots \\ y_{(R-1) \times C} & y_{(R-1) \times C+1} & y_{(R-1) \times C+2} & \cdots & y_{(R \times C-1)} \end{bmatrix}$$

For $d_k^{(0)}$ and $d_k^{(1)}$:

(4) Perform the inter-column permutation for the matrix based on the pattern $\langle P(j) \rangle_{j \in \{0, 1, \ldots, C-1\}}$, where P(j) is the original column position of the j-th permuted column. After permutation of the columns, the inter-column permuted R×C matrix is equal to $$\begin{bmatrix} y_{P(0)} & y_{P(1)} & y_{P(2)} & \cdots & y_{P(C-1)} \\ y_{P(0)+C} & y_{P(1)+C} & y_{P(2)+C} & \cdots & y_{P(C-1)+C} \\ \vdots & \vdots & \vdots & \ddots & \vdots \\ y_{P(0)+(R-1) \times C} & y_{P(1)+(R-1) \times C} & y_{P(2)+(R-1) \times C} & \cdots & y_{P(C-1)+(R-1) \times C} \end{bmatrix}$$

(5) The output of the block interleaver is the bit sequence read out column by column from the inter-column permuted R×C matrix. The bits after sub-block interleaving are denoted by $v_0^{(i)}, v_1^{(i)}, v_2^{(i)}, \ldots, v_{K_\Pi-1}^{(i)}$, where $v_0^{(i)}$ corresponds to $y_{P(0)}$, $v_1^{(i)}$ to $y_{P(0)+C}$, ... and $K_\Pi=(R \times C)$.
For $d_k^{(2)}$:

(4) The output of the sub-block interleaver is denoted by $v_0^{(2)}, v_1^{(2)}, v_2^{(2)}, \ldots, v_{K_\Pi-1}^{(2)}$, where $v_k^{(2)}=y_{\pi(k)}$ and where $$\pi(k) = \left(P\left(\left\lfloor \frac{k}{R} \right\rfloor\right) + C \times (k \bmod R) + 1\right) \bmod K_\Pi.$$

After interleaving, bit-collection unit 307 then collects bits from stream S, $P_0$ and $P_1$. In a preferred embodiment, bit-collection unit 307 interlaces the bits of $P_0$ and $P_1$, and places the interlaced bits behind stream S. For example, sequence W may be formed as $W(k)=S(k)$ for $k=0, \ldots, K_\Pi-1$ $W(K_\Pi+2k)=P_0(k)$ for $k=0, \ldots, K_\Pi-1$ $W(K_\Pi+2k+1)=P_1(k)$ for $k=0, \ldots, K_\Pi-1$ Sequence W may be stored in a buffer such as 105, and thus called a "circular buffer". The description shows that the dummy bits are kept in the circular buffer W, thus it is called a dummy-padded circular buffer. The size of the dummy-padded circular buffer is equal to the summation of the input stream sizes and the total number of dummy bits inserted.

During operation of transmitter 300, a number of coded bits $N_{desired}$ to be selected for transmission is calculated and passed to bit selection and pruning circuitry 309. Bit selection and pruning circuitry 309 simply reads out a length-$N_{desired}$ block of consecutive useful bits from the sequence W (wrapped around to the beginning if last bit of the sequence is exceeded) from a certain starting point. Note that only non-dummy bits are kept for transmission, while dummy bits (if any) are taken from W, are discarded. Also, if filler bits are present in the input stream, some or all of them can be also treated similar to dummy bits (e.g., denoted by <NULL> and not transmitted). In some implementations however, the dummy bits or filler bits might be considered useful for transmission. In general the useful bits correspond to any data bits that are worthwhile to transmit over the channel. Thus, while transmitting, consecutive useful bits from the circular buffer are outputted.

Figure 4:
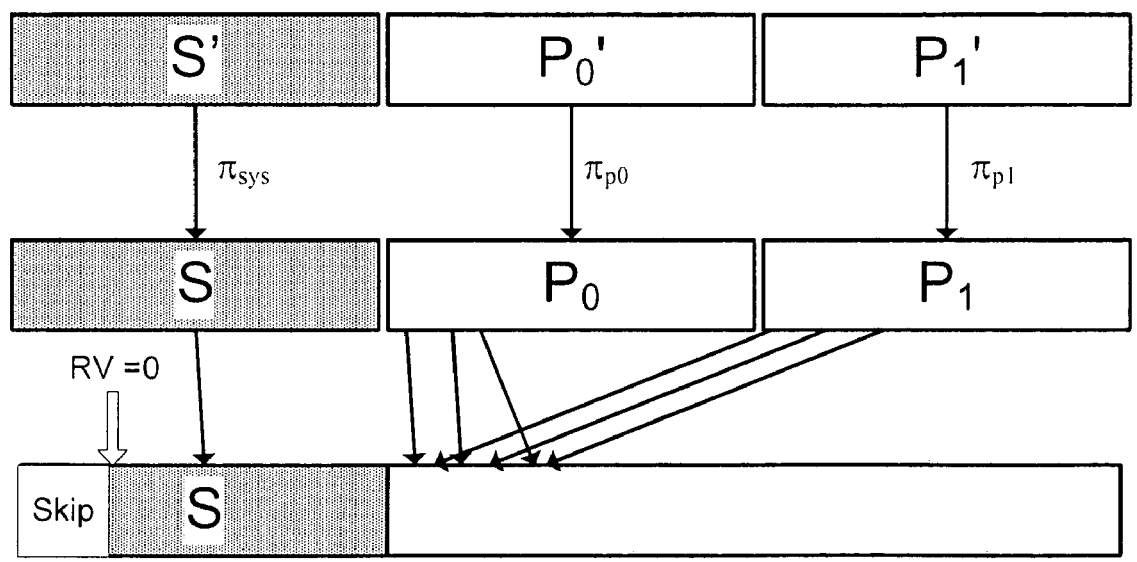
FIG. 4 illustrates a redundancy version.

For Hybrid Automatic Repeat reQuest (HARQ) operation, a parameter (redundancy version (RV)) is provided to bit selection and pruning circuitry 309 to define a starting point (as shown in FIG. 4) within the circular buffer W so that different sections of the buffer may be selected for transmission. Since FEC is equivalent to HARQ with one transmission only, FEC may also be defined with an RV value, denoted by $RV_0$. Thus, bit selection and pruning circuitry 309 receives an RV value and the number of coded bits $N_{desired}$ to be selected for transmission. The $N_{desired}$ non-dummy bits are read out of the circular buffer starting at the position defined by RV. These bits are typically output to transmitter 311 for subsequent processing such as channel interleaving, modulation and transmission from an antenna. Thus, the step of transmitting bits from the circular buffer comprises the steps of: receiving a redundancy version (RV) and a number of desired bits; and transmitting the number of desired bits starting at the RV position.

It should be noted that the particular format for W, S, $P_0$ and $P_1$ are given above for illustration purposes, and may be formatted in several ways. For example, though the circular buffer is represented using a single dimension array (i.e., of sequence format), it can be represented in a two dimensional matrix format via the block-interleavers used for sub-block interleaving. In another example, the sequence W may not need to be stored in a physical circular buffer, as long as the correct output bits are provided to transmitter 311. Thus, the sequence W is sometimes called "virtual circular buffer". While the description above assumed that W contains dummy bits and the dummy bits are removed by bit selection and pruning circuitry 309, in another example, the non-useful bits may be removed by bit-collection unit 307 and sequence W does not contain any non-useful bits. The bit-collection unit can also collect groups of bits.

Figure 5:
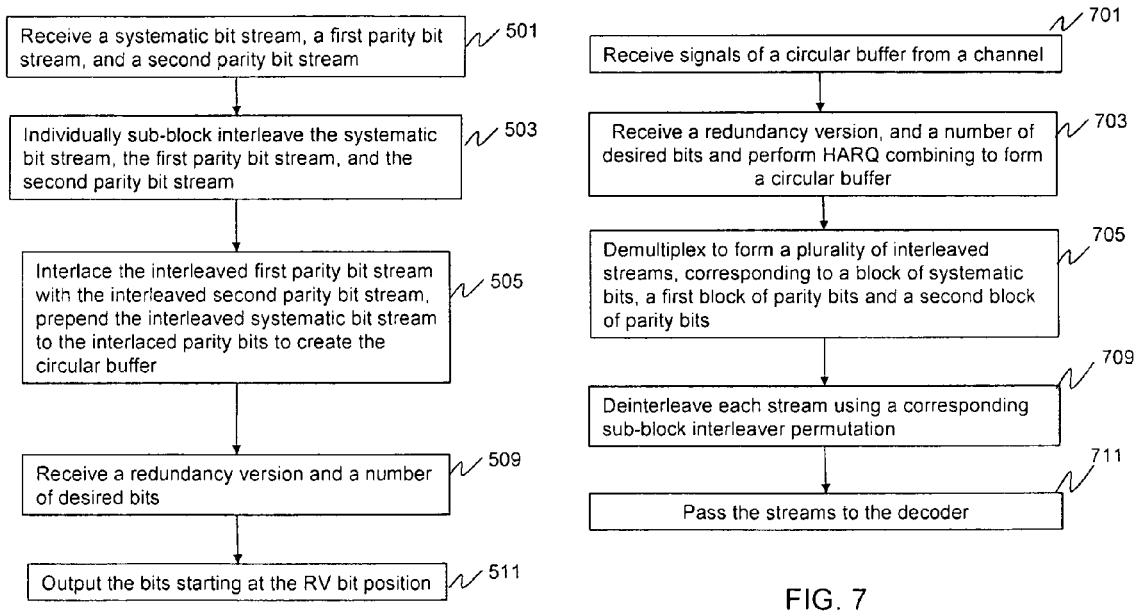
FIG. 5 is a flow chart showing operation of the transmitter of FIG. 3.

FIG. 5 is a flow chart showing operation of the transmitter of FIG. 3. In particular, the logic flow of FIG. 5 shows the steps for sub-block interleaving and forming the circular buffer, and the subsequent transmission of bits/data from circular buffer. The logic flow begins as step 501 where interleavers 305 receives a first, second, and third data stream, which may be symbol or a bit streams. These streams comprise a systematic bit stream, a first parity bit stream, and a second parity bit stream. The bits are output from encoder 301. Interleavers 305 individually sub-block interleaves (via a sub-block interleaver) the systematic bit stream, the first parity bit stream, and the second parity bit stream (step 503). At step 503 each data stream with is individually interleaved with a permutation of a same length $K_\Pi$ to produce first, second, and third interleaved streams, wherein a permutation ($\pi_{p0}$) used to produce the second interleaved stream is the same as a permutation ($\pi_{sys}$) used to produce the first interleaved stream and a permutation ($\pi_{p1}$) used to produce the third interleaved stream is different from $\pi_{sys}$ and each element of $\pi_{p1}$ is derived from the corresponding element of $\pi_{sys}$; As discussed above, the systematic bit stream, the first parity bit stream, and the second parity bit stream may have dummy bits appended during sub-block interleaving so that each stream has length $K_\Pi$.

At step 505, the interleaved streams are multiplexed by bit-collection unit 307 to form a circular buffer. In particular, at step 505 bit-collection unit 307 interlaces the interleaved first parity bit stream with the interleaved second parity bit stream and prepends the interleaved systematic bit stream to the interlaced parity bits to create the circular buffer. Thus, at step 505 the second interleaved stream and third interleaved stream are interlaced to form an intermediate stream, and the first interleaved stream is concatenated with the intermediate stream. Bit selection and pruning circuitry 309 receives a redundancy version and a number of desired bits (step 509) and outputs to the transmitting circuitry 311 the number of desired bits starting at the RV bit position, and transmits the bits from the circular buffer starting at the RV position (step 511). As discussed above, using the redundancy version results in a portion of the first stream not being transmitted. Additionally, the bits transmitted from the circular buffer are preferably consecutive bits from the circular buffer.

Figure 6:
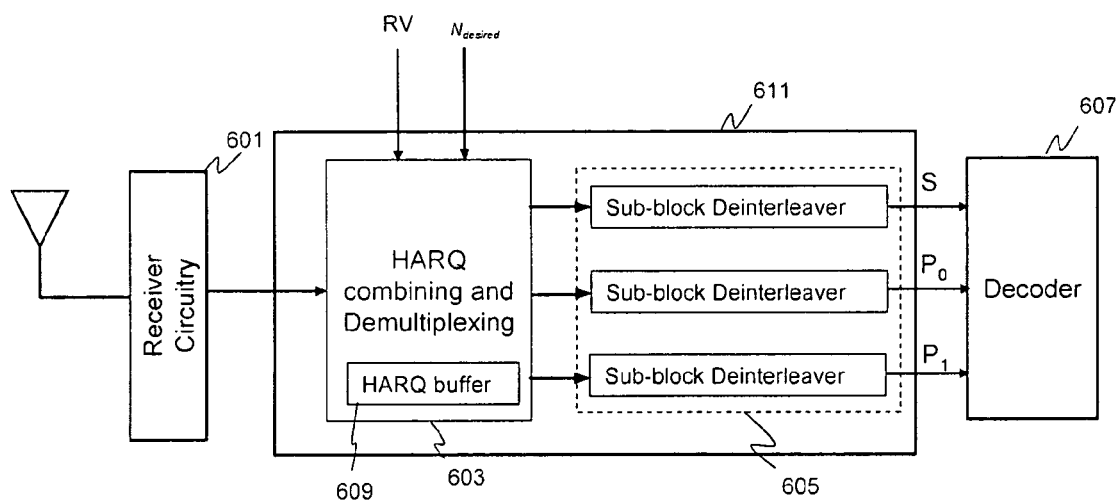
FIG. 6 illustrates a block diagram of a receiver.

FIG. 6 is a block diagram of receiver 600 employing the rate matching technique described above with HARQ operation. Receiver 600 comprises receiver circuitry 601, de-rate matching circuitry 611, and the decoding circuitry 607. De-rate matching circuitry 611 additionally comprises a HARQ combining and de-multiplexing circuitry 603 and sub-block de-interleavers 605. Receiver circuitry 601 receives signals from the channel, where the signals correspond to bits transmitted from a circular buffer. The signals may have been processed and are represented in a format appropriate for subsequent receiver processing, for example, in the format of amplitudes or in the format of log-likelihood ratios (LLRs). De-rate matching circuitry 611 reverses the operations of rate matching circuitry 303. The HARQ combining circuitry is used to combine the bits received from the channel with any previous transmissions for HARQ operation. Thus, the de-rate matching circuitry also comprises a HARQ buffer 609 to store the received values for combining with future retransmissions for supporting HARQ operation. The de-multiplexing circuitry de-multiplexes the signals to form a plurality of interleaved streams, which correspond to streams S, $P_0$, and $P_1$ in the transmitter. The circular buffer bits not transmitted do not have corresponding received signals and may be assigned a given value such as zero by the de-multiplexer.

Elements 603, 605, and 607 are preferably logic circuitry embodied in a microprocessor, microcontroller, digital signal processors (DSPs), or such other devices known to those having ordinary skill in the art. For example, the particular operations/functions of circuitry 603, 605, 607, and 609 thus of receiver 600 are determined by an execution of software instructions and routines. Memory may be utilized to assist the operations of elements 603, 605, 607, and 609, where the memory comprises a random access memory (RAM), dynamic random access memory (DRAM), and/or read only memory (ROM) or equivalents thereof.

Decoder 607 is preferably a rate-⅓ 3GPP turbo decoder, however, the techniques described herein for operating receiver 600 may be applied to other decoders, including, but not limited to turbo decoders performing turbo coding with other code rates, with tail bits or no tail bits, tail-biting, binary or duo-binary turbo coders, with or without filler bits insertion, convolutional code decoder, . . . , etc. If it is assumed that the HARQ combining is already done, then the apparatus of the receiver can be described as containing a receiving circuitry receiving signals of a circular buffer from the channel, a de-multiplexer de-multiplexing the signals to form a plurality of interleaved streams; a de-interleaver to individually de-interleaving each stream according to its permutation to form a plurality of data streams, wherein a permutation ($\pi_{p0}$) of a second stream is the same as a permutation ($\pi_{sys}$) of a first stream and a permutation ($\pi_{p1}$) of a third stream is different from the permutation of the first stream, and each element of $\pi_{p1}$ is derived from the corresponding element of $\pi_{sys}$, and passing the plurality of data streams to a decoder.

It is noted that the steps described in the above receiver structure can be rearranged for reasons such as implementation benefits, etc. For example, the sub-block de-interleaving step can be combined along with the multiplexing operation. In another example, the HARQ buffer may store the LLRs values in the natural (i.e., de-interleaved) order rather than interleaved order. The receiver 600 may be used in the context of FEC as well with slight modification, where the HARQ combining step and the HARQ buffer are not necessary and circuitry 603 is simply a de-multiplexer.

FIG. 7 is a flow chart showing operation of the receiver of FIG. 6. In particular, the logic flow of FIG. 7 shows the steps for forming the circular buffer of received signals, de-multiplexing, sub-block de-interleaving to form streams, and inputting the streams to the decoder. The logic flow begins as step 701 where combining and de-multiplexing circuitry 603 receives a signal (from receiver 601) that comprises contents of a circular buffer transmitted over a channel. The contents of the circular buffer correspond to transmitted bits specified by a redundancy version and a number of desired bits. At step 703, circuitry 603 performs HARQ combining to combine the received signals with previous transmissions to form a circular buffer, where the combining is performed according to the redundancy version and the number of desired bits.

At step 705 the de-multiplexer within circuitry 603 de-multiplexes the signal to form a plurality of interleaved streams, corresponding to a block of interleaved systematic bits, a first block of interleaved parity bits and a second block of interleaved parity bits. The de-multiplexing step comprise the steps of de-concatenating an interleaved first stream with an intermediate stream; and de-interlacing the intermediate stream to form an interleaved second stream and an interleaved third stream. As discussed above, the interleaved systematic bit stream, the interleaved first parity bit stream, and the interleaved second parity bit stream may have dummy bits appended to facilitate sub-block de-interleaving.

At step 709 each stream is de-interleaved individually by de-interleaver 605. This step comprises individually de-interleaving each stream according to a permutation to form a plurality of de-interleaved data streams, wherein a permutation ($\pi_{p0}$) used to de-interleave a second stream is the same as a permutation ($\pi_{sys}$) used to de-interleave a first stream and a permutation ($\pi_{p1}$) used to de-interleave a third stream is different from $\pi_{sys}$, and each element of $\pi_{p1}$ is derived from the corresponding element of $\pi_{sys}$. Decoder 607 receives the three streams for further decoder processing (step 711).

Sub-Block Interleaver Design Example

It was found that the quadratic permutation polynomial (QPP) interleaver adopted for the 3GPP Long Term Evolution (LTE) turbo code has an even-even property. A permutation with even-even property maps all even (odd) positions in the input to all even (odd) positions in the output. Thus the even-indexed parity symbols from parity stream 0 and parity stream 1 are related to the even-indexed symbols from the systematic stream (here the effect of tail bits in the streams is neglected). Therefore, a puncturing that only keeps even-indexed symbols from both parity streams might lead to performance loss as some odd-indexed symbols might receive little protection. At high code rates, it is possible that the puncturing is catastrophic, i.e., the puncturing pattern is unable to recover all systematic symbols, especially with systematic bit puncturing. Thus, this even-even property has to be incorporated into the subblock interleaver design to facilitate systematic bit puncturing and to also reduce the uneven protection levels.

For LTE, the sub-block interleaver for the systematic stream (i.e., a permutation $\pi_{sys}$ of length $K_\Pi$) and the parity 0 stream (i.e., a permutation $\pi_{p0}$ of length $K_\Pi$) are chosen to be identical. The subblock interleaver $\pi_{sys}$ has an even-even property and hence there is likelihood of performance loss at high code rates. This performance loss is avoided by defining the subblock interleaver for parity 1 stream with an odd-valued offset.

The sub-block interleaver of parity 1 stream is offset by an odd value $\delta_1=1$ to exploit i) odd-even property of QPP and ii) the property of sub-block interleaver that naturally puts all the even indices then all the odd indices in the rearranged sub-block. Therefore, for index i, if $\pi_{sys}(i)$ denotes the permutation of the systematic bit sub-block interleaver, then the permutation of the two parity sub-block interleavers are given by $\pi_{p0}(i)=\pi_{sys}(i)$, and $\pi_{p1}(i)=(\pi_{sys}(i)+1)$ % $K_\Pi$, $0\leq i\leq K_\Pi$, where % denotes the modulo operation. In general it is possible to optimize offset $\delta_1$ for different parameters, including block sizes, code rate, percentage of systematic bit puncturing, etc.

A key idea of the sub-block interleaver design is to ensure that in an initial transmission (especially at high coding rates), the parity bits (i.e., from the two parity streams) are selected from the circular buffer in a careful fashion. Thus, the present invention is considered as a key performance enhancement method for circular buffer design and the same idea is integrated with techniques that are geared towards providing implementation benefits (such as virtual circular buffer with dummy bit insertions)

RV Definition

To properly select bits from the circular buffer for transmission, the redundancy reversions need to be pre-defined. Often $2^c$ RVs need to be defined, where c is an integer greater than or equal to 0. Thus, it is convenient to use $C=2^d$ columns in the block interleaver for permuting the bit streams, where d is an integer greater than or equal to c. To further reduce complexity and minimize the amount of dummy bits, it is preferable to use the same value d for all information block sizes of the system. For example, constant d=5 (thus C=32 columns) are used for all information block sizes of 3GPP LTE. Thus for any stream size L, the number of rows R in the block interleaver changes with L, $R=\lceil L/C \rceil=\lceil L/32 \rceil$.

The RVs are defined in the dummy-padded circular buffer for ease of HARQ operation. Assuming the dummy-padded circular buffer size is a multiple of 8, it is possible to define four (or eight or two) RVs that are equally spaced for any stream size L. The RVs can be defined to always start at positions which lie in the same row of the constituent sub-block interleavers, where each sub-block interleaver is based on a block interleaver. In particular, the four RVs can be defined to start at the top of a sub-block interleaver column. It is convenient, in general, to assign the RVs to any positions in the first row (i.e., at the top of a column) of the sub-block interleaver. When described in terms of position in the dummy-padded circular buffer of sequence format, the redundancy versions start at positions R×j, $0\leq j\leq 3\times C-1$, for the rate ⅓ turbo code.

Although the column top is used in the discussion above as a simple way to define starting positions of the RVs, other convenient positions may be used as well. For example, the starting positions of the RVs are all located in a particular row r of the dummy-padded circular buffer, where $0\leq r<R$. In other words, the redundancy versions can start at (R×j+r) % $3K_\Pi$, $0\leq j\leq 3\times C-1$. In another example, the starting positions of each RV may be located in a different row r (that is simple to calculate, e.g., via a lookup table, or a function of the RV, or block size, etc) of the dummy-padded circular buffer.

Note that this RV definition is memoryless for a dummy-padded circular buffer, in the sense that it is easy to start outputting the desired code bits from any RV without requiring the knowledge of the starting position or more importantly ending position of the previous transmission. In the virtual circular buffer, the rate matching algorithm initializes its address generator to an appropriate starting value based on the input parameters (RV number and number of desired bits). Then it directly starts outputting the bits by following the address generation rule as described by the sub-block permutations of the input streams. The address generation rule defines the sequence of positions in the encoder output stream from which the bits are outputted.

Systematic Bit Puncturing

The RV definition discussed above can be refined to accommodate a performance-enhancing technique called systematic puncturing. The proposed method works well for circular buffer operation in many scenarios, including full virtual circular buffer, limited virtual circular buffer (i.e., with $1^{st}$ stage rate matching), etc. In limited virtual circular buffer, the wrap-around point in the circular may be defined as a function of available soft buffer.

Systematic bit puncturing could be combined directly into the definition of the circular buffer. Specifically, the systematic bit puncturing can be accommodated by defining a first redundancy version (RV) appropriately. For instance, in the circular buffer, the first RV ($RV_0$) is assigned to start at j-th column, j>0, instead of $0^{th}$ column. Since $RV_0$ is always used in the first transmission of an information block, 0-th through (j-1)-th columns of the systematic stream may be punctured in the first transmission. If the wraparound in circular buffer occurs in the first transmission, the amount of systematic bits that is punctured may becomes variable or is switched off. Thus, systematic bit puncturing in the circular buffer can be facilitated by defining a redundancy version position for the initial transmission from the circular buffer such that a portion of the first stream is not transmitted. The first stream corresponds to the systematic stream.

Although the discussion focuses on rate matching design for the first transmission (thus FEC), the same circular buffer can be used in the context of HARQ with multiple transmissions per information block. Different redundancy versions for HARQ transmission may be obtained by taking different sections of the circular buffer, where the section size is equal to the length required for the current physical channel transmission (i.e., number of desired bits). In particular, if Y redundancy versions (RV) are needed, a simple way is to define Y different starting points $(A_0, A_1, \ldots, A_{Y-1})$ within the circular buffer, one for a redundancy version. For $RV_i$, the bits are taken from $A_i$ to $\mod(A_i+N_{desired}, N_{CB})$, where i=0, 1, . . . , Y-1, and $N_{desired}$ is the number of bits required for transmission, $N_{CB}$ is the length of the circular buffer, where non-useful bits such as dummy and filler bits are excluded. In other words, $N_{desired}$ bits are read starting with position $A_i$, wrap around to the beginning of the circular buffer if the end the buffer is reached. For a given information block, $N_{desired}$ may be different for each transmission.

Systematic Bit Puncturing Design Example

Continuing with the sub-block interleaver design example, the systematic bit puncturing can be enabled by defining a first redundancy version to skip $\sigma$, $\sigma$>1, systematic columns while outputting bits from the dummy padded circular buffer. For example, the starting positions of a first RV ($RV_0$) in circular buffer may be defined as $k_0 = R \cdot (N_{col} \cdot RV_0 + \sigma)$, where $N_{col}$ is the column spacing between RVs. In general, the bits may be transmitted from position $R \times (N_{col} \times RV_{idx} + \sigma)$ of the circular buffer, wherein $RV_{idx}$ is an integer denoting the redundancy version, $\sigma$, R and $N_{col}$ are integers. Recall R is the number of rows in the block interleaver, $N_{col}$ is of the column spacing, $\sigma$ is an offset number of columns.

While the invention has been particularly shown and described with reference to a particular embodiment, it will be understood by those skilled in the art that various changes in form and details may be made therein without departing from the spirit and scope of the invention. For example, although the procedure is explained with dummy bits insertion and removal, in operations the dummy bits may not be added to the streams and later removed from the circular buffer. Rather the same effect is realized by other ways such as generating the addresses properly. Additionally, starting RVs from a particular row (e.g., column tops) of the circular buffer can be equivalent to start RVs from a particular row in the subblock interleavers for each stream while dummy bits are present. Mapping the starting points to their location within the subblock interleaver may be more convenient for certain implementation, while defining the RV starting points in the circular buffer in sequence format may be more convenient for other implementations. In yet another embodiment there may be other number of bit streams at the output of the encoder, depending on the code rate, and the code construction. For example, a rate ⅕ turbo code has five bit streams at the output of the encoder. Additionally, the bit streams may not have equal length, due to encoder operations such as tail attachment, filler bit insertion and removal. It is intended that such embodiments come within the scope of the following claims.

The invention claimed is:

1. A method for operating a transmitter, the method comprising the steps of:
   receiving a first, second, and third data stream;
   individually interleaving each data stream with a permutation of a same length $K_\Pi$ to produce first, second, and third interleaved streams, wherein a permutation ($\pi_{p0}$) used to produce the second interleaved stream is the same as a permutation ($\pi_{sys}$) used to produce the first interleaved stream and a permutation ($\pi_{p1}$) used to produce the third interleaved stream is different from $\pi_{sys}$, and each element of $\pi_{p1}$ is derived from the corresponding element of $\pi_{sys}$;
   multiplexing the interleaved streams to form a circular buffer; and
   transmitting bits from the circular buffer;
   wherein the step of multiplexing the interleaved streams to form the circular buffer comprises the steps of:
   interlacing the second interleaved stream and third interleaved stream to form an intermediate stream; and
   concatenating the first interleaved stream with the intermediate stream.

2. The method of claim 1 wherein the data streams comprise symbol streams or bit streams.

3. The method of claim 1 wherein each element of the permutation $\pi_{p1}$ is derived from a corresponding element of $\pi_{sys}$ via function $\pi_{p1}(i) = f(\pi_{sys}(i), \delta_1)$, $0 \leq i < K_\Pi$, where $\delta_1$ is an integer.

4. The method of claim 3 wherein each element of $\pi_{p1}$ is derived from a corresponding element of $\pi_{sys}$ via function $\pi_{p1}(i) = (\pi_{sys}(i) + \delta_1) \% K_\Pi$, $0 \leq i < K_\Pi$.

5. The method of claim 4 wherein $\delta_1 = 1$.

6. The method of claim 1 wherein the step of transmitting bits from the circular buffer comprises the steps of:
   receiving a redundancy version (RV) and a number of desired bits; and
   transmitting the number of desired bits from the circular buffer starting at the RV position.

7. The method of claim 6 wherein the redundancy version results in a portion of the first stream not being transmitted.

8. The method of claim 6 wherein the step of transmitting the number of desired bits from the circular buffer comprises the step of transmitting the number of desired bits from position $R \times (N_{col} \times RV_{idx} + \sigma)$ of the circular buffer, wherein $RV_{idx}$ is an integer denoting the redundancy version, and $\sigma$, R and $N_{col}$ are integers.

9. The method of claim 1 wherein the first data stream comprises a systematic stream, the second data stream comprises a first parity stream, and the third data stream comprises a second parity stream.

10. The method of claim 1 where the step of interleaving comprises the step of interleaving via a sub-block interleaver.

11. The method of claim 1 wherein the step of individually interleaving each data stream comprises the step of adding dummy bits to each data stream before individually interleaving so that each stream has length $K_\Pi$.

12. The method of claim 11 wherein the step of transmitting bits from the circular buffer comprise the step of outputting consecutive bits from the circular buffer.

13. A method for operating a receiver, the method comprising the steps of:
   receiving a signal comprising contents of a circular buffer over a channel;
   de-multiplexing the signal to form a plurality of interleaved streams;
   individually de-interleaving each stream according to a permutation to form a plurality of de-interleaved data streams, wherein a permutation ($\pi_{p0}$) used to de-interleave a second stream is the same as a permutation ($\pi_{sys}$) used to de-interleave a first stream and a permutation ($\pi_{p1}$) used to de-interleave a third stream is different from $\pi_{sys}$, and each element of $\pi_{p1}$ is derived from the corresponding element of $\pi_{sys}$; and
   passing the plurality of de-interleaved data streams to a decoder;
   wherein the step of de-multiplexing comprises the steps of:
   de-concatenating an interleaved first stream with an intermediate stream; and
   de-interlacing the intermediate stream to form an interleaved second stream and an interleaved third stream.

14. The method of claim 13 wherein each element of $\pi_{p1}$ is derived from a corresponding element of $\pi_{sys}$ via function $\pi_{p1}(i) = (\pi_{sys}(i) + \delta_1) \% K_\Pi$, $0 \leq i < K_\Pi$, where $\delta_1$ is an integer.

15. An apparatus comprising:
   an encoder outputting a plurality of data streams;
   interleaving circuitry individually interleaving each data stream to form a first, second, and third interleaved stream with each stream formed by using a permutation of a same length $K_\Pi$, wherein a permutation ($\pi_{p0}$) used to form the second interleaved stream is the same as a permutation ($\pi_{sys}$) used to form the first interleaved stream and a permutation ($\pi_{p1}$) used to form the third interleaved stream is different from $\pi_{sys}$, and each element of $\pi_{p1}$ is derived from the corresponding element of $\pi_{sys}$;

bit-collection circuitry multiplexing the interleaved streams to form a circular buffer; and transmission circuitry transmitting bits from the circular buffer;

wherein the bit-collection circuitry forms the circular buffer by:

interlacing the interleaved second stream and interleaved third stream to form an intermediate stream; and concatenating the interleaved first stream with the intermediate stream.

16. The apparatus of claim 15 wherein the bit-collection circuitry forms the circular buffer by:

interlacing the interleaved second stream and interleaved third stream to form an intermediate stream; and concatenating the interleaved first stream with the intermediate stream.

17. The apparatus of claim 15 wherein each element of $\pi_{p1}$ is derived from a corresponding element of $\pi_{sys}$ via function $\pi_{p1}(i)=(\pi_{sys}(i)+\delta_1) \% K_\Pi$, $0 \leq i < K_\Pi$, where $\delta_1$ is an integer.

18. An apparatus for operating a receiver, the apparatus comprising:

receiving circuitry receiving contents of a circular buffer over a channel;

a de-multiplexer de-multiplexing the signals to form a plurality of interleaved streams by de-concatenating an interleaved first stream with an intermediate stream and de-interlacing the intermediate stream to form an interleaved second stream and an interleaved third stream;

a de-interleaver individually de-interleaving each interleaved stream according a permutation to form a first, second, and third de-interleaved data stream, wherein a permutation ($\pi_{p0}$) used to form the second de-interleaved data stream is the same as a permutation ($\pi_{sys}$) used to form the first de-interleaved data and a permutation ($\pi_{p1}$) used to form the third de-interleaved data stream is different from $\pi_{sys}$, and each element of $\pi_{p1}$ is derived from the corresponding element of $\pi_{sys}$;

a decoder to decode de-interleaved data streams.

* * * * *